United States Patent
Refat et al.

(10) Patent No.: US 12,327,433 B2
(45) Date of Patent: Jun. 10, 2025

(54) SPOOF IMAGES FOR USER AUTHENTICATION

(71) Applicant: Ford Global Technologies, LLC, Dearborn, MI (US)

(72) Inventors: Rafi Ud Daula Refat, Ann Arbor, MI (US); Hafiz Malik, Canton, MI (US); Ali Hassani, Ann Arbor, MI (US); Justin Miller, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 17/817,665

(22) Filed: Aug. 5, 2022

(65) Prior Publication Data

US 2024/0046708 A1 Feb. 8, 2024

(51) Int. Cl.
*G06V 40/40* (2022.01)
*G06V 10/82* (2022.01)
*G06V 40/16* (2022.01)
*G06V 40/50* (2022.01)

(52) U.S. Cl.
CPC ............. *G06V 40/45* (2022.01); *G06V 10/82* (2022.01); *G06V 40/171* (2022.01); *G06V 40/172* (2022.01); *G06V 40/50* (2022.01)

(58) Field of Classification Search
CPC ...... G06V 10/82; G06V 40/172; G06V 40/40; G06V 40/45; G06V 40/171; G06V 40/50; G06V 10/774; G06V 40/16; G06N 3/0475; G06N 3/094; G06F 21/32
See application file for complete search history.

(56) References Cited

U.S. PATENT DOCUMENTS

| | | | |
|---|---|---|---|
| 8,856,541 B1 * | 10/2014 | Chaudhury | G06V 40/67 726/16 |
| 10,824,914 B2 | 11/2020 | Yoo et al. | |
| 2016/0057138 A1 * | 2/2016 | Hoyos | G06V 40/168 726/7 |
| 2019/0341054 A1 * | 11/2019 | Krupka | G06V 10/764 |
| 2020/0053558 A1 * | 2/2020 | Hallock | G06N 7/01 |
| 2020/0184053 A1 | 6/2020 | Kursun | |
| 2021/0049452 A1 | 2/2021 | Fan et al. | |
| 2021/0064901 A1 * | 3/2021 | Vorobiev | G06V 40/45 |
| 2021/0097260 A1 | 4/2021 | Verma et al. | |
| 2024/0037995 A1 * | 2/2024 | Raha | G06V 40/172 |

* cited by examiner

*Primary Examiner* — Stephen R Koziol
*Assistant Examiner* — Michael Kim Maiden
(74) *Attorney, Agent, or Firm* — Christopher Storms; Brooks Kushman P.C.

(57) ABSTRACT

A facial recognition authentication system and method include obtaining a current image in response to a request for facial recognition authentication of a user. A set of current image features are generated from the input image. Live image features and spoof image features are retrieved for the user. Then a determination is output that the input image is one of live or spoofed based on a comparison of the current image features to the live image features and the spoof image features.

19 Claims, 4 Drawing Sheets

SPOOF IMAGES FOR USER AUTHENTICATION

BACKGROUND

Various kinds of biometric authentication may be used to control access to and/or usage of various electronic systems, such as security systems, banking systems, home automation systems, smartphones, vehicles, etc. One example of biometric authentication is face (or facial) recognition, in which a computing device receives a real-time image of a user's face and determines whether the image matches, within a specified degree of confidence, a stored image of the user's face. If the image matches, then a user can be authorized to access and or using features of the electronic system. Unauthorized users whose images do not match a stored image can be prevented from accessing or using the electronic system. Difficulties can arise when an unauthorized user attempts to "spoof" the system by causing the system to authenticate a user from an image of an object that looks like the user, rather from a real image of the live user.

DETAILED DESCRIPTION

Introduction

Distinguishing spoofed images from current images can pose a variety of technical difficulties, and can employ a variety of complex software and hardware. Disclosed herein is a technique for distinguishing between spoofed images and real, or live, images of a user that provides for enhanced computational efficiency, and may allow spoof detection to be implemented in computers 100 that otherwise would not have computational power to perform face authentication incorporating spoof detection, and/or that could not do so without querying a more powerful remote server 106. Thus, the disclosed systems and methods can also improve computer 100 security. The spoof detection systems and methods described herein could be implemented in a variety of environments such as a vehicle, a smart phone, a home automation system, a security system, or an automated teller machine.

Figure 1:
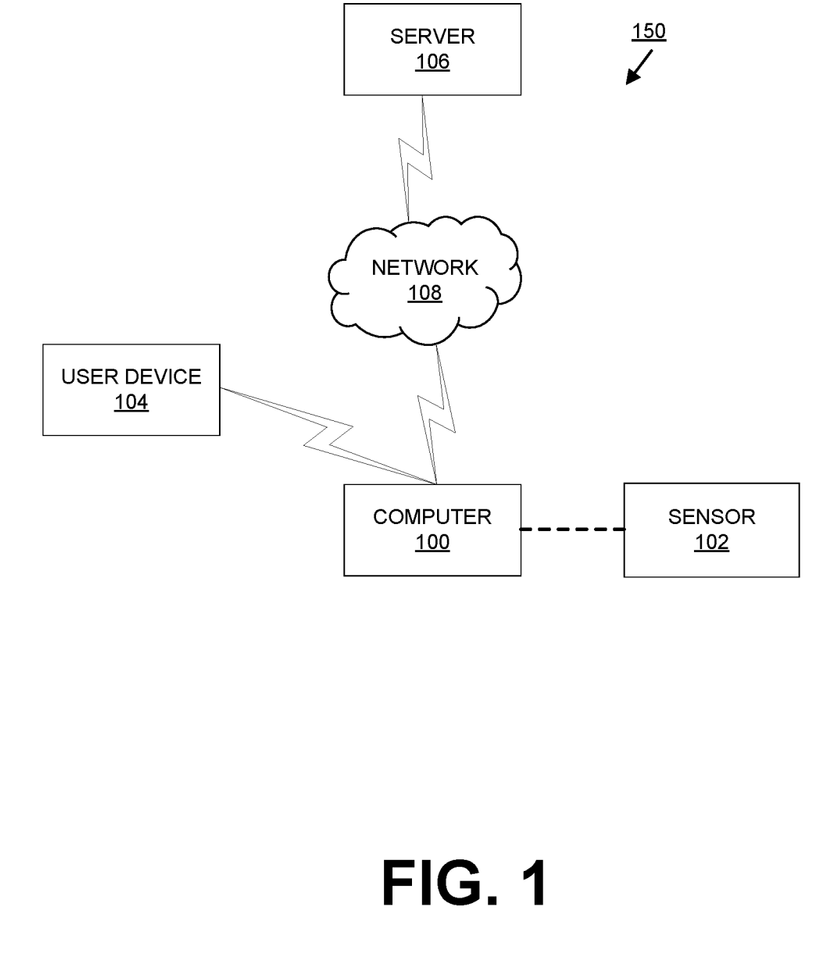
FIG. 1 is a block diagram of a facial recognition system.

Turning to FIG. 1, a block diagram of an example system 150, a computer 100 can be provided to perform user authentication via facial recognition. The user authentication includes a live image or images of the user captured when the user enrolled in the authentication system, i.e., (a) reference image(s) that can be stored and subsequently used when the user requests authentication. Further, the user authentication can include a spoof image or images generated from the live enrollment image or images. The spoof enrollment image or images can also be stored and subsequently used when the user requests authentication.

In an example, in a user authentication process, an image sensor 102 such as a camera captures a current image that is provided to the computer 100. The computer 100 can then compare the current image not only to a stored enrollment live image of the user, but to stored spoof images of the user. Or put another way, the computer 100 can compare the current image to a plurality of stored enrollment images, where a first one of the enrollment images is a live or real image of the user, and one or more other enrollment images are spoof images of the user generated from the live enrollment image. That is, a captured enrollment image is typically presumed to be a live image. A live image means in image that was directly captured of a live (or real) user, i.e., of a person in a field of view of a camera without any disguise or obscuring (such as by wearing a mask or wig). The spoof image means an image intended to emulate a live image but that is not a live (or real) image. For example, a photo of a live image could be a spoof image, as could an image of a user wearing a mask representing features of another user, etc.

As described below in more detail, the computer 100 can compare a current image to the enrollment image(s) by comparing features of the respective images that can be generated embeddings 215 from a neural network, generated according to a transformation function, or some other suitable technique. Storing the spoof images along with the live enrollment image provides advantages. For example, generating and/or attempting to detect spoof images can be computationally expensive and in many environments is impractical. In implementations described herein, computationally expensive processing associated with spoof images can be performed by the computer 100 at enrollment time and/or by a remote computer 100 after enrollment, to determine if the image is a spoof image during a user authentication process.

Accordingly, the present disclosure includes a computer comprising a processor and a memory, the memory storing instructions executable such that the processor is programmed to: obtain a current image in response to a request for facial recognition authentication of a user; generate a set of current image features from the input image; retrieve live image features and spoof image features for the user; and output a determination that the input image is one of live or spoofed based on a comparison of the current image features to the live image features and the spoof image features.

The live image features and the spoof image features can include live image embeddings and spoof image embeddings output from a neural network. The spoof image embeddings can be stored in the memory of the computer after being generated by inputting a spoof image to a neural network. The spoof image can be generated by inputting an enrollment image to a generative adversarial network. The generative adversarial network can include a generator and can be trained using a discriminator. The live image embeddings can be stored in the memory of the computer after being generated by inputting an enrollment image input by the user to a neural network. The enrollment image can be a spoofed image or a live image. The neural network can be trained with live training images of a plurality of live faces and respective spoof training images of the live faces. The live training images can be input to the neural network with style codes that indicate, for respective segments of each of the respective live training images, an attribute of the respective segment.

The live image features and the spoof image features can include stored metrics determined from an enrollment image input from a user. The stored metrics can include at least one of light reflectance and motion. The spoof embeddings can be retrieved based on a pose of the user identified from the input image. The spoof image features can be determined by a transformation applied to the live image features.

The computer can be installed in one of a vehicle, a smart phone a home automation system, a security system, or an automated teller machine.

A method comprises obtaining a current image in response to a request for facial recognition authentication of a user; generating a set of current image features from the input image; retrieving live image features and spoof image features for the user; and outputting a determination that the input image can be one of live or spoofed based on a comparison of the current image features to the live image features and the spoof image features.

The live image features and the spoof image features can include live image embeddings and spoof image embeddings output from a neural network. The spoof image embeddings can be stored in the memory of the computer after being generated by inputting a spoof image to a neural network. The spoof image can be generated by inputting an enrollment image to a generative adversarial network. The generative adversarial network can include a generator and can be trained using a discriminator. The live image embeddings can be stored in the memory of the computer after being generated by inputting an enrollment image input by the user to a neural network. The enrollment image can be a spoofed image or a live image. The neural network can be trained with live training images of a plurality of live faces and respective spoof training images of the live faces. The live training images can be input to the neural network with style codes that indicate, for respective segments of each of the respective live training images, an attribute of the respective segment.

The live image features and the spoof image features can include stored metrics determined from an enrollment image input from a user. The stored metrics can include at least one of light reflectance and motion. The spoof embeddings can be retrieved based on a pose of the user identified from the input image. The spoof image features can be determined by a transformation applied to the live image features.

System Overview

The computer 100 includes a processor and a memory. The memory includes one or more forms of volatile and non-volatile computer-readable media, and stores instructions executable by the computer 100 for performing various operations, including as disclosed herein. For example, a computer 100 can be a generic computer 100 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 102 data and/or communicating the sensor 102 data. In another example, a computer 100 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 100.

The memory can be of any type, e.g., hard disk drives, solid state drives, servers 106, or any volatile or non-volatile media. The memory can store the collected data sent from the sensors 102. The memory can be a separate device from the computer 100, and the computer 100 can retrieve information stored by the memory via a network in the vehicle, e.g., over a CAN bus, a wireless network, etc. Alternatively or additionally, the memory can be part of the computer 100, e.g., as a memory of the computer 100. In a vehicle, a computer 100 may include programming to operate one or more of vehicle brakes, propulsion e.g., control of acceleration in the vehicle by controlling one or more of an internal combustion engine, electric motor, hybrid engine, etc., steering, climate control, interior and/or exterior lights, etc., as well as to determine whether and when the computer 100, as opposed to a human operator, is to control such operations. Additionally, the computer 100 may be programmed to determine whether and when a human operator is to control such operations. The computer 100 may include or be communicatively coupled to, e.g., via a vehicle network such as a communications bus, more than one processor, e.g., included in components such as sensors 102, electronic control units (ECUs) or the like included in the vehicle for monitoring and/or controlling various vehicle components, e.g., a powertrain controller, a brake controller, a steering controller, etc. The computer 100 is generally arranged for communications on a vehicle communication network that can include a bus in the vehicle such as a controller area network CAN or the like, and/or other wired and/or wireless mechanisms. Alternatively or additionally, in cases where the computer 100 actually comprises a plurality of devices, the vehicle communication network may be used for communications between devices represented as the computer 100 in this disclosure. Further, various controllers and/or sensors 102 may provide data to the computer 100, e.g., via a wired or wireless network such as a vehicle communication network.

A computer 100 can receive data from one or more sensors 102. A sensor 102 is a device that can obtain one or more measurements of one or more physical phenomena. For example, an image sensor 102 can be an camera that captures images from a specified spectrum of light, e.g., the visible light spectrum. A camera image sensor 102 can detect electromagnetic radiation in some range of wavelengths. For example, an image sensor 102 may detect visible light, infrared radiation, ultraviolet light, or some range of wavelengths including visible, infrared, and/or ultraviolet light. For example, the camera can be a charge-coupled device CCD, complementary metal oxide semiconductor CMOS, or any other suitable type. For another example, the sensors 102 may be a time-of-flight TOF cameras, which include a modulated light source for illuminating the environment and detect both reflected light from the modulated light source and ambient light to sense reflectivity amplitudes and distances to the scene. A camera could be included in or packaged with a computer 100, e.g., as a smartphone or tablet computer 100 camera, or could be communicatively coupled to the computer 100 via a wired or wireless network, e.g., as an image sensor 102 in or on a vehicle.

The computer 100 can obtain an input image 210 from an image sensor 102 in response to a request for facial recognition authentication of a user. The image sensor 102 may be an optical camera that renders images based on light in the visible spectrum, but alternatively or additionally could be another kind of camera or image sensor 102, i.e., could operate by detecting infrared radiation, thermal radiation, etc. A user wishing to access the computer 100 and/or applications thereon, e.g., a user wishing to access a vehicle and/or to enable functions of a vehicle, could initiate a request for facial recognition to the computer 100 by providing some input, e.g., to a display of the computer 100, or via a user device 104 (e.g., a smart phone or the like) in wireless or wired communication with the computer 100.

The computer 100 may also be in communication with a remote server 106. The computer 100 can communicate with the user device 104 and/or the remote server 106 via any suitable mechanism, including a wide area network 108 and/or various wired and/or wireless technologies. A wide area network 108 can include one or more mechanisms by which a vehicle computer 100 may communicate with, for example, a remote server 106. Accordingly, communications between devices herein, including via the wide area network 108, can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle to everything V2X such as cellular V2X CV2X, Dedicated Short Range Communications DSRC, etc., local area networks LAN and/or wide area networks 108 WAN, including the Internet, providing data communication services.

Upon receiving an input image 210 purporting to be of a user seeking authentication, sometimes referred to herein as the "current" image, the computer 100 can execute programming to generate a set of current image features from the input image 210, and to retrieve wide image features and spoof image features for the user that have been previously generated and stored, e.g., at a time that the user was enrolled in the authentication system. Herein, "image features" means a set of numeric values that describe an image. In one example, image features are embeddings 215 generated by a neural network, that is, the live image features and the spoof image features can be neural network output comprising live image embeddings 215 and spoof image embeddings 215. In another example, image features are specified metrics associated with one or more pixels in an image, such as light reflectance and motion. The computer 100 can then output a determination that the input image 210 is one of live or spoofed based on a comparison of the live image features to the spoof image features.

Spoof Image Generation

Figure 2:
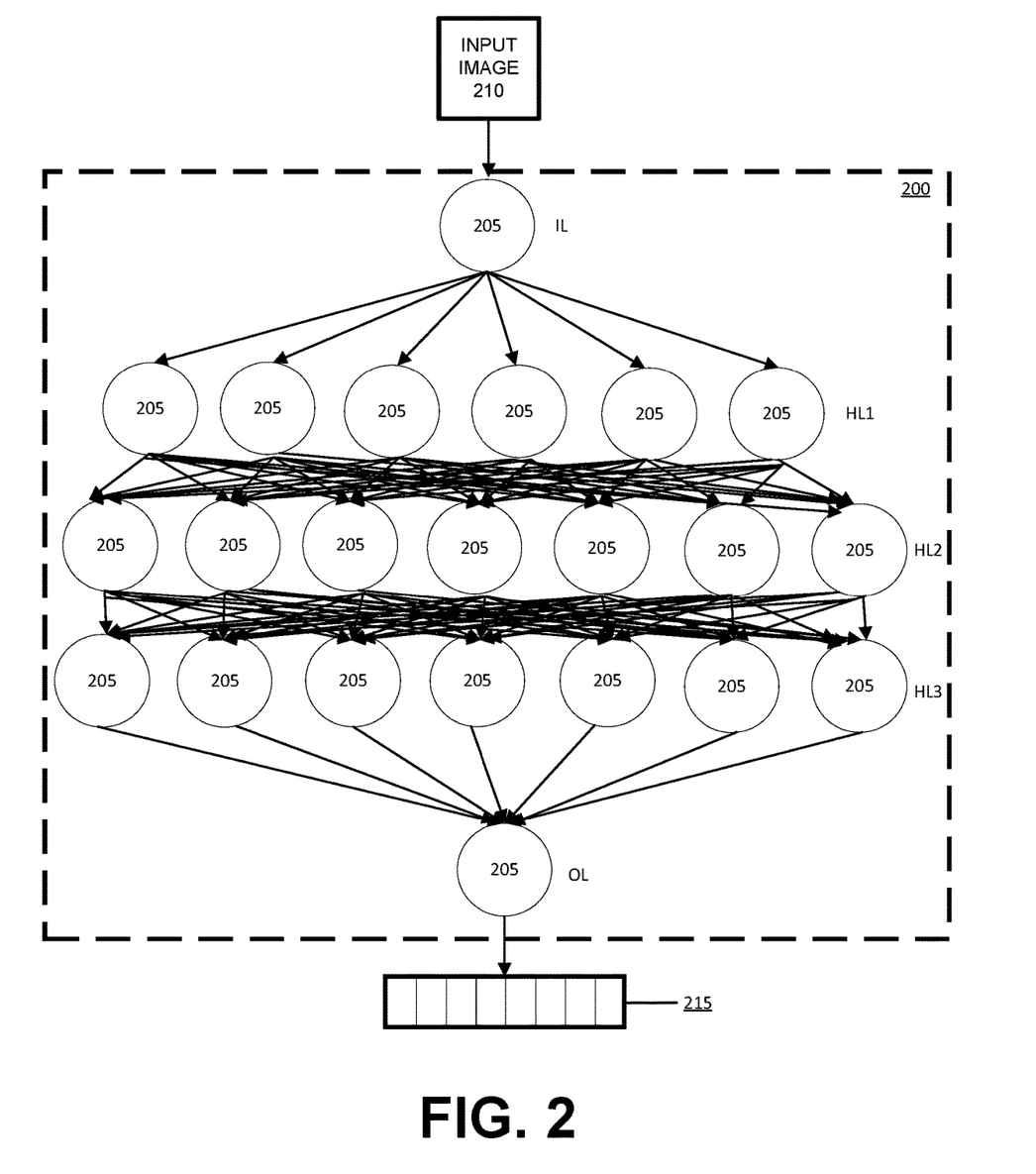
FIG. 2 is a block diagram of a convolutional neural network for generating embeddings of an input image.

A deep neural network (DNN) such as a convolutional neural network (CNN) can be used to generate the live image embeddings 215. FIG. 2 is a block diagram of a CNN 200 for generating embeddings 215 of an input image 210. The term "embedding" is used in the present context as that term is commonly understood in the field of machine learning, i.e., in the present context an image embedding 215 is a vector representation of the image output by a trained neural network such as a CNN 200.

The CNN 200 includes multiple nodes 205, sometimes referred to as neurons because they are designed to be analogous to neurons in an animal brain. The nodes 205 are arranged so that the CNN 200 includes an input layer IL, one or more hidden layers HL1, HL2, HL3, and an output layer OL. Each layer of the CNN 200 can include a plurality of nodes 205. While FIG. 2 illustrates two hidden layers, it is understood that the CNN 200 can include additional or fewer hidden layers. The input and output layers for the CNN 200 are shown with respective single nodes 205 for ease of illustration, but could include a plurality of input or output nodes 205, respectively. A set of inputs (represented by the arrows) to each node 205 can be each multiplied by respective weights. The weighted inputs can then be summed in an input function to provide, possibly adjusted by a bias, a net input. The net input can then be provided to an activation function, which in turn provides a connected node 205 an output. The activation function can be a variety of suitable functions, typically selected based on empirical analysis. As illustrated by the arrows in FIG. 2, node 205 outputs can then be provided for inclusion in a set of inputs to one or more nodes 205 in a next layer.

In implementations based on the present disclosure, a CNN 200 can be trained to output embeddings 215 based on an input image 210. In general, a CNN 200 can be trained with ground truth data, i.e., data about a real-world condition or state. For example, the CNN 200 can be trained with images of people, e.g. their faces, to generate a set of embeddings 215 from an input image 210 of a user. In training, weights can be initialized by using a Gaussian distribution, for example, and a bias for each node 205 can be set to zero. Training the CNN 200 can include updating weights and biases via suitable techniques such as back-propagation with optimizations, whereby the trained CNN 200 outputs embeddings 215 that represent an input image 210 within a specified degree of confidence. A later time, the embeddings 215 can be compared to a newly obtained image, e.g., or facial recognition and authentication of a user. Further, as described herein, embeddings 215 can be generated for a newly obtained image and these can be compared to the live image embeddings 215 and to spoof image embeddings 215 to detect a spoof image.

A DNN such as a CNN 200 can also be used to generate the spoof image embeddings 215. The DNN in this case can be a generative adversarial network (GAN) trained to generate spoof images from an input live image. Accordingly, during an enrollment process the computer 100 can obtain a live image and generate live image embeddings 215, and can also generate spoof images and/or spoof image embeddings 215 based on the spoof images generated from the live image. That is, a CNN 200 can be trained to generate the spoof image embeddings 215 based on spoof images generated from the live image.

The DNN used to generate spoof images can be an adversarial network and can be trained in a manner similar to a generative adversarial network (GAN). A generative adversarial network is a neural network that includes a generative network that modifies input images 210 to provide an output image, and a discriminator network that is trained to determine whether a modified image is similar to and/or whether a modified image is distinguishable from a selected image type (e.g., spoofed or live). For example, a GAN can be trained to generate spoof images from input real images. In this example the discriminator would output a "TRUE" result when the generator outputs an image that is similar in appearance to a spoof image and a "FALSE" result when the output image is not similar in appearance to a spoof image. During training, the generator receives positive feedback when the discriminator outputs a "TRUE" result and receives negative feedback when the discriminator outputs a "FALSE" result. In this fashion the generator can be trained to output images that appear to be spoof images in response to real image inputs.

Image similarity can be determined for example, by comparing images using image subtraction, where a first image is subtracted from a second image and the absolute or squared differences between the two images are summed. Small absolute or squared differences (<1% of total summed pixel values) indicate similar images. In another example, image similarity can be determined based on correlation techniques that correlate regions of a first image with regions of a second image. High correlation (>90%) between the two images indicate similar images. A GAN could be trained to modify input images 210 realistically enough to be determined as "spoofed" by the discriminator network. A GAN can be trained to generate images from noise inputs and training images 305.

Figure 3:
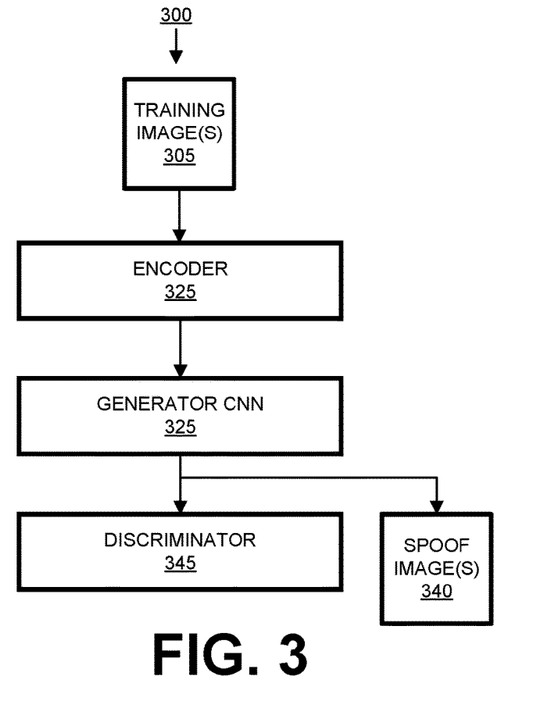
FIG. 3 illustrates an example spoof generator training system.

FIG. 3 illustrates a training system 300 for training a spoof generator GAN in which input training images 305 are provided to an encoder 325 which encodes features of the training images 305 for input to a generator CNN 325. Following training, the discriminator 325 is removed and the encoder 325 and generator CNN 325 generate a spoof image 340 from an input image 210. The spoof images 340 and a training data set of live (real) images can be used to train a CNN 200 to generate live image embeddings in response to a live image input and spoof image embeddings in response to a spoof image input as illustrated in FIG. 4.

Referring to FIG. 3, an input training image 305, e.g., a live image of a user, can be provided to an encoder 325, which segments the input image 210 and encodes the segments of the image to provide input to a generator CNN 325. The input to the generator CNN 325 thus includes encoded features of the live image, e.g., feature vectors that include a representation of feature labels, sometimes called "style codes," and locations of features included in the input image 210. For example, features that can be represented by style codes include type of spoof, material, gender, skin tone, age, pose, etc., in addition to describing features at locations in an image (e.g., at specified pixel coordinates), such as a nose, lips, eyes, etc. The generator CNN 325 generates a spoof image 340 which is passed to a discriminator 345 network trained to determine whether the input image 210 is a live image or a spoofed image. The discriminator can be trained to distinguish between a live image of a user and a spoof image of a user in the same manner that a discriminator is trained for a GAN to distinguish between fake and real images. Once trained, the generator CNN 325 can be used to generate spoof images 340.

Exemplary Processes

Figure 4:
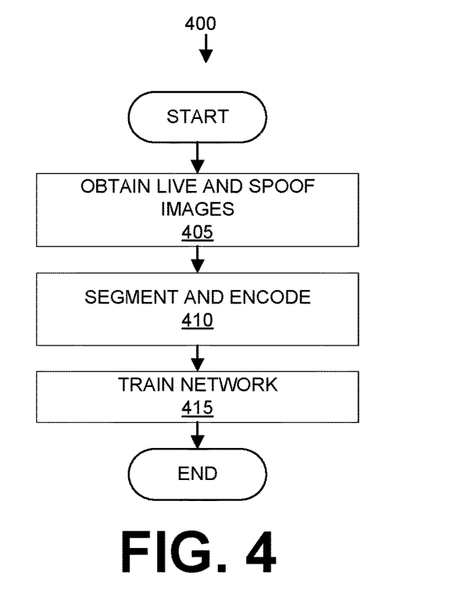
FIG. 4 is a process flow diagram illustrating an example process for training a spoof generator CNN.

Thus, a CNN 200 can be used to generate current image embeddings 215 and/or live image embeddings 215, and, as illustrated further with respect to FIG. 4 the generator CNN 200 can be used to generate spoof image embeddings 215. FIG. 4 is a process flow diagram illustrating an example process 400 for training a CNN 200. The process may be performed at a central server 106 to the like, and then the CNN 200 can be provided to computers 100 for use in enrolling and authenticating users, e.g., in smart phones, vehicles, etc.

The process 400 begins in a block 405, in which a training server 106 is provided with a corpus of training images, typically thousands of live input images 210 of users with associated spoof input images 340.

Next, in a block 410, training images are segmented and encoded. For example, image segmentation techniques can be applied to determine pixel coordinates defining segments of respective images associated with various features of the image.

Next, in the block 415, the CNN 200 is trained to generate live embeddings for live images and spoof embeddings for spoof images.

Following the block 415, the process 400 ends.

Figure 5:
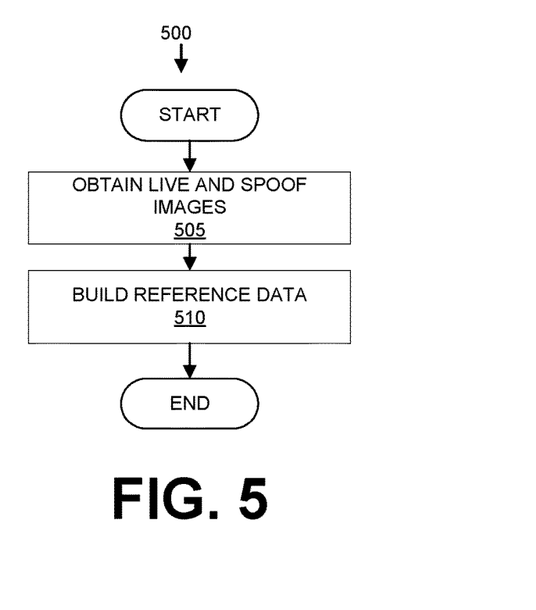
FIG. 5 is a process flow diagram illustrating an example process determining live image features and spoof image features based on quantifiable metrics.

As an alternative to using a trained CNN 200 to determine live image embeddings and spoof image embeddings, a deterministic technique could be used. FIG. 5 illustrates a process 500 for determining live image features and spoof image features based on quantifiable metrics that can be determined from an image. The quantifiable metrics can include for example, measures of light reflectance, motion, etc. The quantifiable metrics can be based on data that indicates that live images have light reflectance properties that differ from spoof images.

The process 500 begins in a block 505, in which sample live images and sample spoof images are obtained. The spoof images can be classified according to a spoof type, i.e., a classification of a technique used to generate the spoof image, such as photographing an image, a user wearing a mask, a user wearing a wig, etc.

Next, in a block 510, a reference data set with live image features and spoof image features can be constructed. For example, the reference data set can be a lookup table or the like in which values of image metrics, e.g., light reflectance, motion, etc., are stored for live images and various types of spoof images.

Following the block 510, the process 500 ends.

Figure 6:
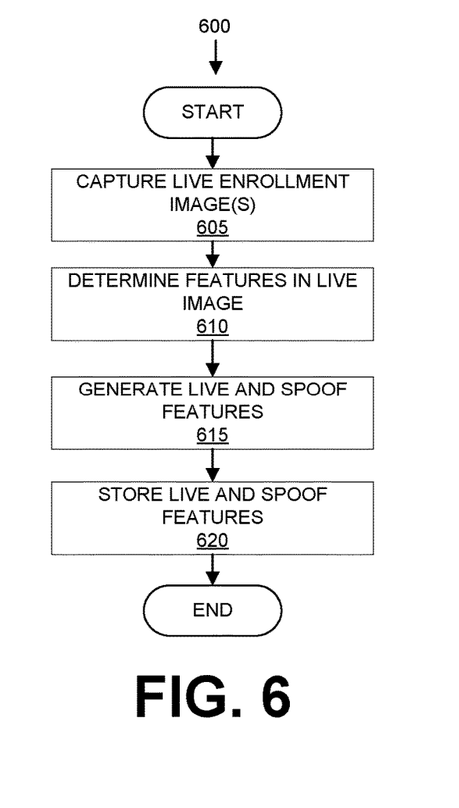
FIG. 6 is a process flow diagram illustrating an example process for enrolling a user in an authentication system.

FIG. 6 is a process flow diagram illustrating an example process 600 for enrolling a user in an authentication system and generating and deploying live embeddings 215 and spoof embeddings 215. The process 600 can be carried out according to program instructions in the computer 100, for example.

The process 600 begins a block 605, in which the computer 100 captures a live enrollment image of the user. For example, a user accessing a system such as a vehicle, smart phone, etc., for a first time, after being authenticated by a trusted mechanism such as a two-step authentication process or the like, can provide the live enrollment image the a camera sensor 102 as described above. The user may provide a plurality of live enrollment images, e.g., in different poses (i.e., orientations in six degrees of freedom with respect to an axis of a camera sensor 102 lens), in different light conditions, etc. Further, in some implementations the user may have the option of providing one or more spoof enrollment images. For example, the user could be prompted to provide a photo of a live image. In addition to supplied spoof images, live enrollment image can be input to a spoof generator GAN discussed in relation to FIG. 3, above. Spoof generator GAN can input one or more live enrollment images and output one or more spoof images. Spoof images obtained during an enrollment can then be used as spoof enrollment images for generating spoof embeddings 215, or alternatively or additionally for further training of a CNN 200, for example.

Next, in a block 610, features are extracted from the live image. For example, the image could be provided to a feature extractor CNN 200.

Next, in a block 615, features are extracted from the one or more spoof images 340. Alternatively or additionally, the spoof image embeddings 215 could be generated based on the extracting features, i.e., quantifiable metrics as described above, for the live image and applying a transformation function to generate the spoof embeddings 215.

Next, in a block 620, the computer 100 stores the live image features and the spoof image features. Note that the blocks 610 and 615 could be executed by the computer 100, or the computer 100 could provide one or more enrollment images to a remote server 106, which could then return the live and spoof image features to the computer 100, which then stores them. For example, spoof embeddings 215 could be stored in the memory of the computer 100 after being generated by inputting an enrollment image input by the user to a CNN 200. Alternatively or additionally, the server 106 could store the wife and spoof image features, and further could then provide the live and spoof embeddings 215 to the computer 100 and/or other systems attempting to authenticate the user upon receiving a request.

Following the block 620, the process 600 ends.

Figure 7:
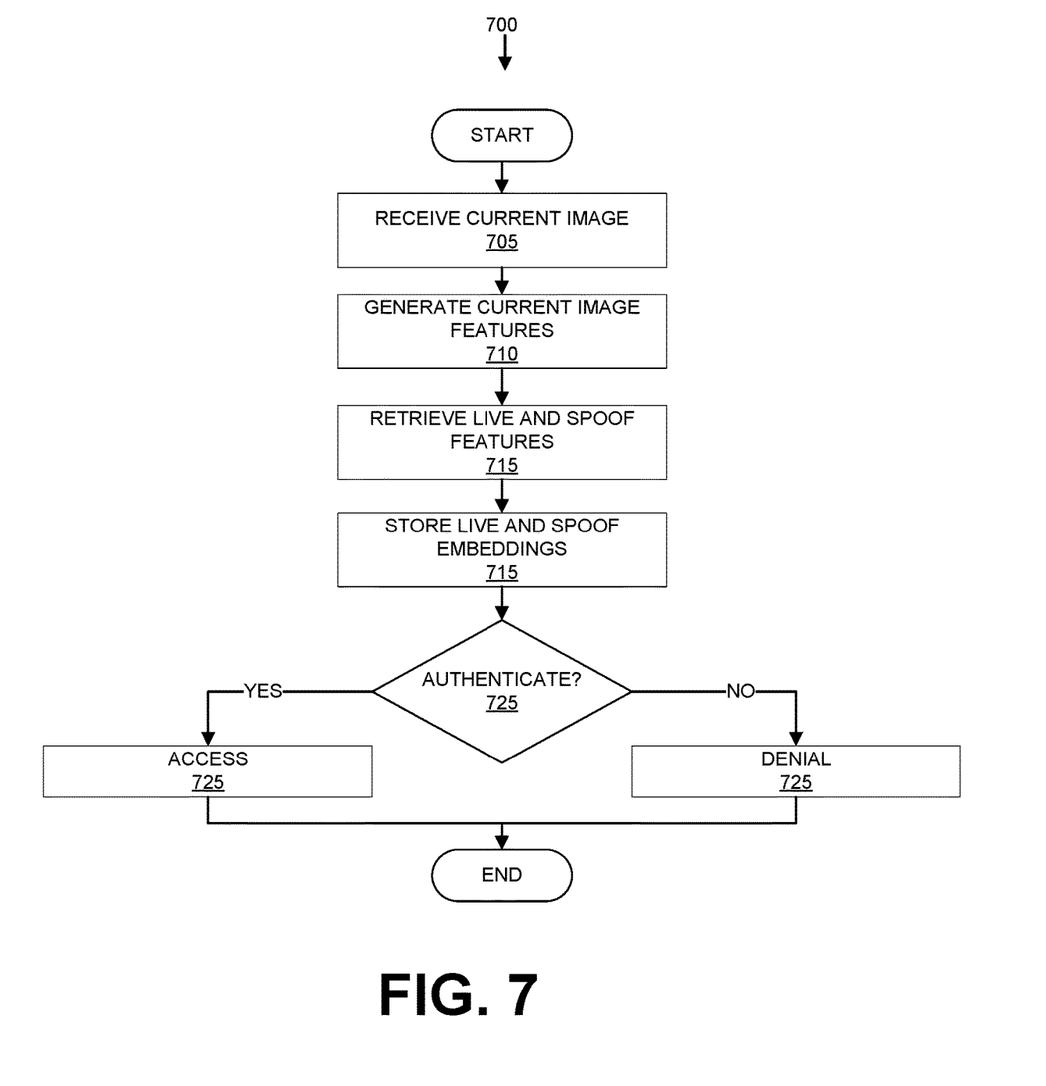
FIG. 7 is a process flow diagram illustrating an example process for enrolling a user in generating and deploying live embeddings and spoof embeddings.

FIG. 7 is a process flow diagram illustrating an example process 700 for authenticating a user, including determining whether a current image is a live image or a spoofed image.

The process 700 can begin a block 705, in which the computer 100 receives a current image of a user, typically because the user has initiated an authentication process in the computer 100. For example, the user could be requesting access to hardware and/or software, e.g., a vehicle, a software application, a smart phone, etc.

Next, in a block 710, the computer 100 generate current image features. For example, computer 100 may input the current image to a CNN 200 to generate current image features. Alternatively, as described above, the computer 100 could apply a predetermined transformation function to the image.

Next, in a block 715, the computer 100 retrieves stored live image features and spoof image features associated with an identifier for the user purporting to be the user of the current image, e.g., a user requesting authentication.

Next, any decision block 720, the computer 100 determines whether the user can be authenticated, that is, the computer 100 can determine that the current image is one of live or spoofed based on comparing the current image features to the live image features in the spoof image features. If the user is authenticated, a block 725 is executed next. Otherwise, a block 730 is executed next.

In the block 725, the computer 100 can output an authentication determination and/or can actuate a system for which authentication is requested. For example, the computer 100 could actuate vehicle windows or doors, enable a vehicle ignition, provide access to the vehicle infotainment system, etc. In another example, the computer 100 could provide access to a smart phone home screen or the like.

In the block 730, the computer 100 outputs a denial of authentication, and denies access to the requested system.

The process 700 can end following either of the blocks 725, 730.

CONCLUSION

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Computer executable instructions may be compiled or interpreted from computer 100 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 100. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable such that the processor is programmed to:

obtain a current image in response to a request for facial recognition authentication of a user;

generate a set of current image features from the current image;

retrieve live image features and spoof image features for the user, wherein retrieving the spoof image features includes retrieving spoof embeddings based on a six-degree of freedom pose of the user identified from the current image; and output a determination that the input image is one of live or spoofed based on a comparison of the current image features to the live image features and the spoof image features.

2. The computer of claim 1, wherein the live image features and the spoof image features include live image embeddings and spoof image embeddings output from a neural network.

3. The computer of claim 2, wherein the spoof image embeddings are stored in the memory of the computer after being generated by inputting a spoof image to a neural network.

4. The computer of claim 3, wherein the spoof image is generated by inputting an enrollment image to a generative adversarial network.

5. The computer of claim 4, wherein the generative adversarial network includes a generator and is trained using a discriminator.

6. The computer of claim 2, wherein the live image embeddings are stored in the memory of the computer after being generated by inputting an enrollment image input by the user to a neural network.

7. The computer of claim 6, wherein the enrollment image is a spoofed image.

8. The computer of claim 6 wherein the enrollment image is a live image.

9. The computer of claim 2, wherein the neural network is trained with live training images of a plurality of live faces and respective spoof training images of the live faces.

10. The computer of claim 9, wherein the live training images are input to the neural network with style codes that indicate, for respective segments of each of the respective live training images, an attribute of the respective segment.

11. The computer of claim 1, wherein the live image features and the spoof image features include stored metrics determined from an enrollment image input from a user.

12. The computer of claim 11, wherein the stored metrics include at least one of light reflectance and motion.

13. The computer of claim 1, wherein the spoof image features are determined by a transformation applied to the live image features.

14. The computer of claim 1, wherein the computer is installed in one of a vehicle, a smart phone a home automation system, a security system, or an automated teller machine.

15. A method, comprising:
obtaining a current image in response to a request for facial recognition authentication of a user;
generating a set of current image features from the current image;
retrieving live image features and spoof image features for the user, wherein retrieving the spoof image features includes retrieving spoof embeddings based on a six-degree of freedom pose of the user identified from the current image; and
outputting a determination that the input image is one of live or spoofed based on a comparison of the current image features to the live image features and the spoof image features.

16. The method of claim 15, wherein the live image features and the spoof image features include live image embeddings and spoof image embeddings output from a neural network.

17. The method of claim 16, wherein the spoof image embeddings are stored in the memory of the computer after being generated by inputting a spoof image to a neural network.

18. The method of claim 17, wherein the spoof image is generated by inputting an enrollment image to a generative adversarial network.

19. The method of claim 15, wherein the live image features and the spoof image features include stored metrics determined from an enrollment image input from a user.

* * * * *